United States Patent
Hu et al.

(10) Patent No.: US 8,176,382 B2
(45) Date of Patent: May 8, 2012

(54) STORAGE APPARATUS, METHOD FOR ACCESSING DATA AND FOR MANAGING MEMORY BLOCK

(75) Inventors: Chia-Ming Hu, Taipei County (TW); Chun-Yu Hsieh, Taichung (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 1136 days.

(21) Appl. No.: 12/022,112

(22) Filed: Jan. 29, 2008

(65) Prior Publication Data

US 2009/0125783 A1    May 14, 2009

(30) Foreign Application Priority Data

Nov. 9, 2007   (TW) ............................... 96142491 A

(51) Int. Cl.
*H03M 13/00* (2006.01)
(52) U.S. Cl. ........................ 714/758; 714/763
(58) Field of Classification Search .................. 714/758, 714/763
See application file for complete search history.

(56) References Cited

U.S. PATENT DOCUMENTS

| | | | | |
|---|---|---|---|---|
| 4,819,231 A | * | 4/1989 | Yamada | 375/367 |
| 5,740,349 A | * | 4/1998 | Hasbun et al. | 714/6.13 |
| 5,881,132 A | * | 3/1999 | O'Brien et al. | 379/35 |
| 5,974,564 A | * | 10/1999 | Jeddeloh | 714/6.13 |
| 6,035,432 A | * | 3/2000 | Jeddeloh | 714/763 |
| 7,171,594 B2 | * | 1/2007 | Wyatt et al. | 714/704 |
| 7,392,457 B2 | * | 6/2008 | Tamura et al. | 714/763 |

FOREIGN PATENT DOCUMENTS

| | | |
|---|---|---|
| TW | 382709 | 2/2000 |
| TW | 562948 | 11/2003 |
| TW | I249100 | 2/2006 |

* cited by examiner

*Primary Examiner* — Esaw Abraham
(74) *Attorney, Agent, or Firm* — Winston Hsu; Scott Margo

(57) ABSTRACT

A method for managing a memory block is provided. In this method, a plurality of block tables having different storing priorities is provided. In addition, the number of error correction bits in the memory block is checked. Thereby, in the present invention, data can be stored into the memory block in a block table according to the number of error correction bits in the memory block so that the sequence in which the memory block is used for storing data is determined.

8 Claims, 5 Drawing Sheets

STORAGE APPARATUS, METHOD FOR ACCESSING DATA AND FOR MANAGING MEMORY BLOCK

CROSS-REFERENCE TO RELATED APPLICATION

This application claims the priority benefit of Taiwan application serial no. 96142491, filed on Nov. 9, 2007. The entirety of the above-mentioned patent application is hereby incorporated by reference herein and made a part of this specification.

BACKGROUND OF THE INVENTION

1. Field of the Invention

The present invention generally relates to a technique for accessing data and managing memory blocks, in particular, to a technique for accessing data and managing memory blocks which can extend the lifespan of a storage apparatus.

2. Description of Related Art

FIG. 1 is a diagram of a non-volatile memory structure. Referring to FIG. 1, the non-volatile memory 100 (for example, a flash memory) includes a plurality of memory blocks, such as memory blocks 102, 104, and 106, for storing data. These memory blocks are arranged as an array therefore can be referred as a memory block array. Each of the memory blocks has a storage space of a particular capacity. However, errors may occur to some bits in these memory blocks after these memory blocks are used for some time, and these erroneous bits may be referred as error bits. Conventionally, when error bits are found in a memory block, these error bits are corrected through bit correction and the corrected bits are detected as error correction bits or error correction code (ECC).

FIG. 2 is a diagram illustrating a conventional method for managing a memory block. Referring to FIG. 2, the conventional non-volatile memory (for example, a flash memory) can be divided into a normal block table 202 and a disabled block table 204. Conventionally, a memory block is placed into the normal block table 202 when the number of error correction bits in the memory block is determined to be lower than a predetermined value. Accordingly, data in the memory blocks in the normal block table 202 of the flash memory can be accessed normally.

On the other hand, if the number of error correction bits in a memory block is determined to be higher than the predetermined value (N-Bit ECC), for example, higher than 4, data error may occur when data is stored in the memory block. Thus, conventionally, this memory block is placed into the disabled block table 204 so that data will not be stored into a memory block in the disabled block table 204. If the disabled block table 204 has no more available space, the flash memory will be locked so that data cannot be written into the flash memory anymore.

Even though the memory blocks in the normal block table are all usable memory blocks, many usable memory blocks are actually at the edge of being disabled. For example, assuming the above predetermined value is 4, the numbers of error correction bits in some memory blocks may be 3 or exactly 4. Namely, these memory blocks have to be moved from the normal block table 202 to the disabled block table 204 once another 1 or 2 error correction bits occur in these memory blocks. However, conventionally, how many error correction bits a memory block of a non-volatile memory has is not taken into consideration when data is stored into the memory block. Thus, if those memory blocks at the edge of being disabled are always used for data accessing, these memory blocks will soon be disabled and accordingly the lifespan of the non-volatile memory will be shortened.

SUMMARY OF THE INVENTION

Accordingly, the present invention is directed to a storage apparatus having extended lifespan.

The present invention is directed to a method for accessing data. The method is suitable for a storage apparatus and can extend the lifespan of the storage apparatus.

The present invention is directed to a method for managing a memory block. The method can manage the healthiness of a storage apparatus effectively so as to extend the lifespan thereof.

The present invention provides a storage apparatus including an interface unit, an access control unit, and a memory unit. The interface unit is coupled to the access control unit, and the access control unit is coupled to the memory unit. The access control unit receives data through the interface unit and stores the data into the memory unit, or the access control unit reads data from the memory unit and sends the data to a data transmission interface through the interface unit for transmission. The memory unit includes a plurality of memory blocks and a plurality of block tables. Each of the memory blocks has n error correction bits, wherein n is a positive integer greater than or equal to 1. In addition, the block tables respectively have different storing priorities. Those memory blocks having the same number of error correction bits are placed into the same block table, and the less error correction bits a memory block has, the higher storing priority the block table has in which the memory block is placed. Thus, the access control unit can store data into the memory blocks of each block table according to the storing priority of the block table.

The present invention provides a method for reading data that capable of reading data from above storage apparatus. In this method, data is read from a memory block in the storage apparatus, and whether the memory block being read has error bits is checked. If the memory block has error bits, the error bits are corrected and detected as error correction bits. In addition, the block table in which the memory block is placed is determined according to the number of error correction bits in the memory block so that the memory blocks in each block table have the same number of error correction bits. The block tables respectively have different storing priorities, and the less error correction bits a memory block has, the higher storing priority of the block table has in which the memory block is placed.

The present invention provides a method for storing data. In this method, a plurality of block tables respectively having different storing priorities is provided. Besides, a plurality of memory blocks is provided, and these memory blocks can be respectively placed into the block tables. In addition, each of the memory blocks has n error correction bits, wherein n is a positive integer greater than or equal to 1. Those memory blocks having the same number of error correction bits can be placed into the same block table. Thus, data can be stored into the memory blocks of each block table according to the storing priority of the block table.

The present invention provides a data accessing method for a storage apparatus. In this method, a plurality of block tables having different storing priorities is provided, and a plurality of memory blocks respectively having n error correction bits is provided, wherein n is a positive integer greater than or equal to 1. While reading data from a memory block, in which block table the memory block is placed can be determined according to the number of error correction bits in the memory block, so that the memory blocks in each block table have the same number of error correction bits. In addition, the less error correction bits a memory block has, the higher storing priority the block table has in which the memory block is placed. Moreover, while storing data into the storage apparatus, the data can be stored in the memory blocks of each block table according to the storing priority of the block table.

The present invention provides a method for managing a memory block. In this method, a plurality of block tables having different storing priorities is provided. In addition, the number of error correction bits in the memory block is checked. The memory block is placed into one of the block tables according to the number of error correction bits in the memory block, so that the sequence in which the memory block is used for storing data can be determined.

According to an embodiment of the present invention, the block tables include a plurality of normal block tables and a disabled block tables. When the number of error correction bits in a memory block is not greater than a predetermined value, the memory block is placed into one of the normal block tables. On the other hand, when the number of error correction bits in a memory block is greater than the predetermined value, the memory block is placed into the disabled block table so that it will not be used for storing data.

In the present invention, those memory blocks having the same number of error correction bits are placed into the same block table so that the healthiness of a storage apparatus can be effectively managed. Moreover, in the present invention, data is stored into memory blocks in each block table according to the storing priority of the block table, so that the lifespan of the storage apparatus can be effectively extended.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
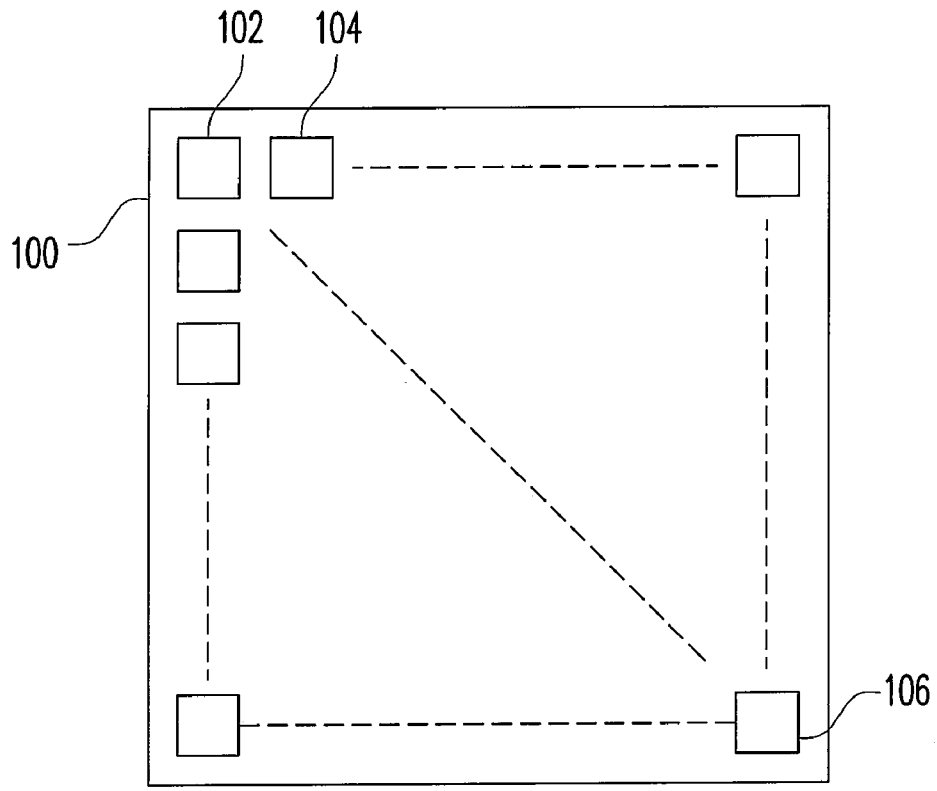
FIG. 1 is a diagram of a non-volatile memory structure.
Figure 2:
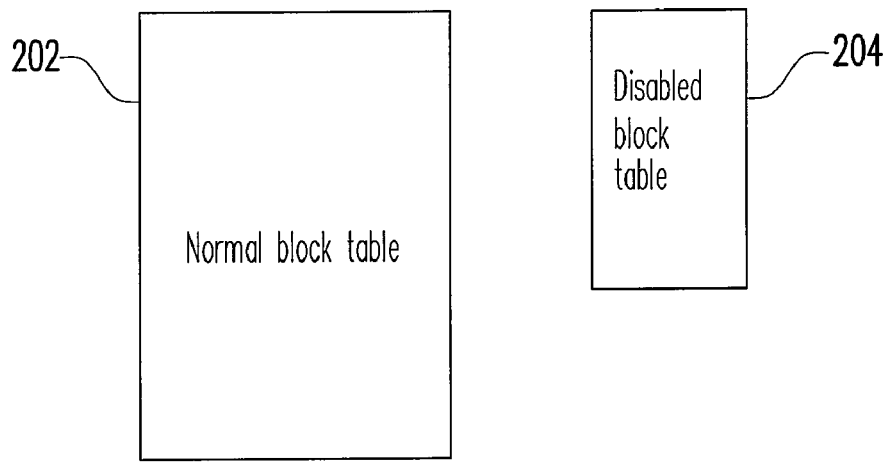
FIG. 2 is a diagram illustrating a conventional method for managing a memory block.

Reference will now be made in detail to the present preferred embodiments of the invention, examples of which are illustrated in the accompanying drawings. Wherever possible, the same reference numbers are used in the drawings and the description to refer to the same or like parts.

Figure 3:
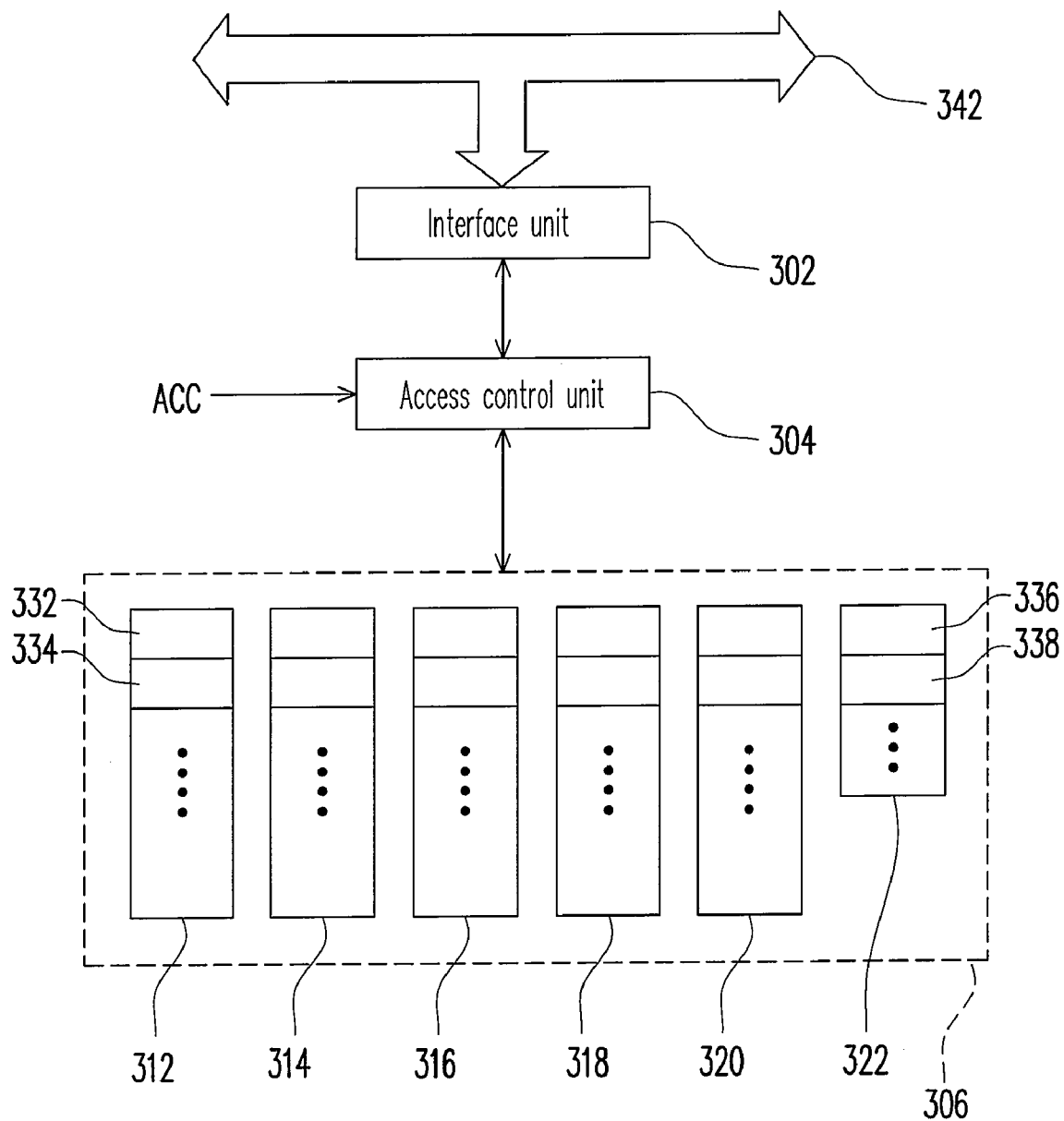
FIG. 3 is a block diagram of a storage apparatus according to an embodiment of the present invention.

FIG. 3 is a block diagram of a storage apparatus according to an embodiment of the present invention. Referring to FIG. 3, the storage apparatus 300 includes an interface unit 302, an access control unit 304, and a memory unit 306. The interface unit 302 is coupled to a data transmission interface 342 and the access control unit 304, and the access control unit 304 is coupled to the memory unit 306. The access control unit 304 stores a data received by the interface unit 302 from the data transmission interface 342 into the memory unit 306. In addition, the access control unit 304 reads a data from the memory unit 306 and sends the data to the data transmission interface 342 through the interface unit 302. In the present embodiment, the data transmission interface 342 may be a wireless or cable transmission interface, such as a universal serial bus (USB).

The memory unit 306 may be a flash memory and which has a plurality of block tables, such as block tables 312, 314, 316, 318, 320, and 322. In addition, the memory unit 306 further has a plurality of memory blocks, such as memory blocks 332, 334, 336, and 338, and these memory blocks are respectively placed in at least one of the block tables 312, 314, 316, 318, 320, and 322. In the present embodiment, the block tables are categorized into normal block tables 312, 314, 316, 318, and 320 and a disabled block table 322. The access control unit 304 will not access the memory blocks (for example, the memory blocks 336 and 338) in the disabled block table 322, and the reason for that will be described below.

Particularly, the block tables have different storing priorities, for example, the block table 312 has the highest storing priority, the block table 314 has the second highest storing priority, and the block table 320 has the lowest storing priority. In addition, each of the memory blocks has n error correction bits, wherein n is a positive integer greater than or equal to 1. In the present embodiment, those memory blocks having the same number of error correction bits are placed in the same block table. For example, all the memory blocks in the block table 312 have 0 error correction bit. In other words, all the memory blocks in the block table 312 are normal memory blocks.

Additionally, the less error correction bits a memory block has, the higher storing priority the block table has in which the memory block is placed. For example, a memory block having no error correction bit is placed in the block table 312, and a memory block having only one error correction bit is placed in the block table 314, and so on.

Figure 4:
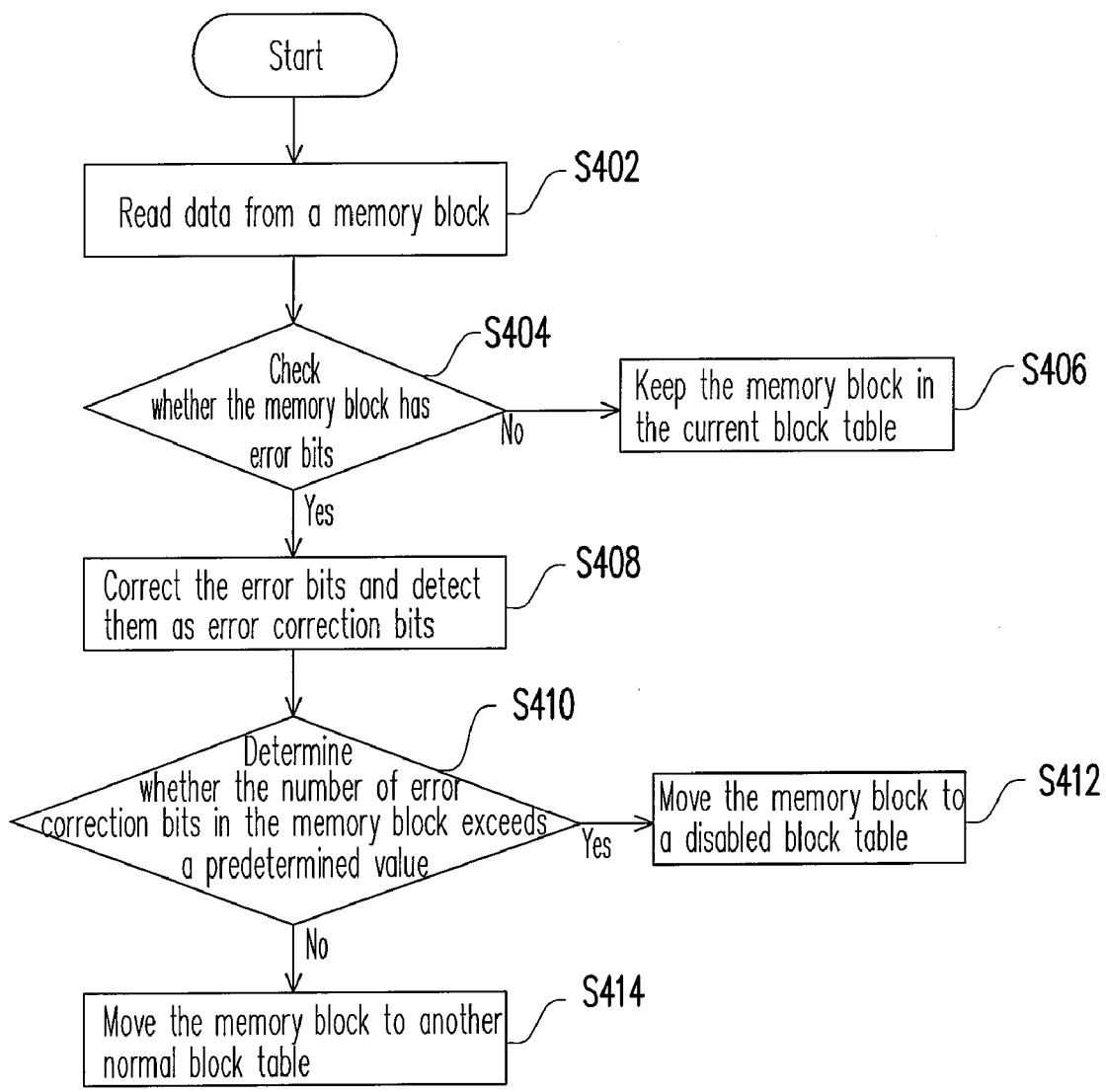
FIG. 4 is a flowchart illustrating a method for reading data according to an embodiment of the present invention.

FIG. 4 is a flowchart illustrating a method for reading data according to an embodiment of the present invention. Referring to both FIG. 3 and FIG. 4, when the access control unit 304 receives an access command ACC and is about to read a data from the memory unit 306, the access control unit 304 reads the data from the corresponding memory block, as in step S402. Next, in step S404, the access control unit 304 checks whether the memory block has error bits.

In step S406, the access control unit 304 keeps the memory block in the current block table after it reads the data if the access control unit 304 determines that the memory block does not contain any error bit (as "no" in step S404). On the other hand, in step S408, the access control unit 304 corrects the error bits and detects them as error correction bits when the access control unit 304 determines that there are error bits in the memory block (as "yes" in step S404).

In step S410, the access control unit 304 determines whether the number of error correction bits in the memory block exceeds a predetermined value. In the present embodiment, the predetermined value may be 4. When the access control unit 304 determines that the number of error correction bits in the memory block is greater than the predetermined value (as "yes" in step S410), which means data stored in this memory block has non-recoverable bit error, the access control unit 304 executes step S412 to move the memory block to the disabled block table 322, so that the access control unit 304 does not use the memory block in the disabled block table 322 for storing data when next time a data is stored.

Contrarily, if the number of error correction bits in the memory block does not exceeds the predetermined value (as "no" in step S410), the access control unit 304 moves the memory block to the corresponding normal block table according to the number of error correction bits in the memory block, as in step S414. For example, the access control unit 304 determines that a 1 bit program code is erroneous when the access control unit 304 reads a data in the memory block 332 in the block table 312. Here, the access control unit 304 corrects the error bit in the memory block 332 and then detects the error corrected bit as an error correction bit, as in step 408. In step S414, since there is only 1 error correction bit in the memory block 332, the access control unit 304 moves the memory block 332 from the block table 312 to a normal block table or keeps the memory block 332 in the current block table, such as the block table 314.

Figure 5:
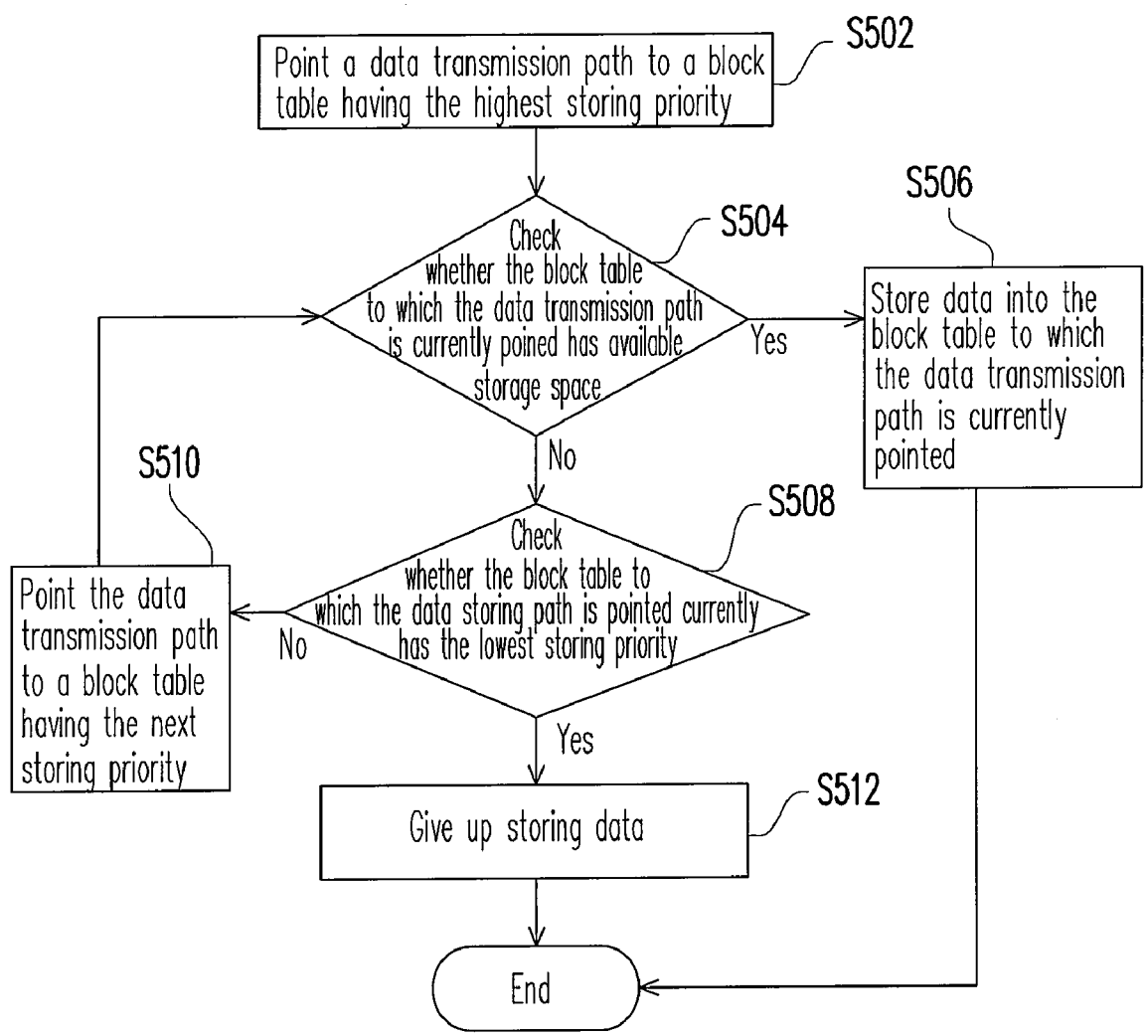
FIG. 5 is a flowchart illustrating a method for storing data according to an embodiment of the present invention.

FIG. 5 is a flowchart illustrating a method for storing data according to an embodiment of the present invention. Referring to both FIG. 3 and FIG. 5, when the interface unit 302 receives a data from the data transmission interface 342 and is about to store the data into the storage apparatus 300, the interface unit 302 sends the received data to the access control unit 304 first. In step S502, a data transmission path is pointed to the block table having the highest storing priority, for example, the block table 312, by the access control unit 304 according to an access command ACC. As described above, the memory block placed in the block table 312, for example, the memory blocks 332 and 334, may be complete memory blocks without any error correction bit. Thus, data access can be carried out to these memory blocks frequently.

Additionally, the access control unit 304 checks whether or not the block table to which the data transmission path is currently pointed has available storage space for storing data, as in step S504. Presently, the data transmission path is pointed to the block table having the highest storing priority, namely, the block table 312. Thus, the access control unit 304 checks whether the memory blocks in the block table 312 has extra storage space for storing data. Assuming that there is still extra storage space in the block table 312 for storing data (as "yes" in step S504), the access control unit 304 executes step S506 to store the data into the block table to which the data transmission path is currently pointed (i.e. the block table 312).

Contrarily, if the access control unit 304 determines that the block table 312 has no more extra storage space, the access control unit 304 executes step S508 to check whether the block table to which the data transmission path is currently pointed has the lowest storing priority. Since the data transmission path is currently pointed to the block table 312 and the block table 312 does not have the lowest storing priority (as "no" in step S508), the access control unit 304 points the data transmission path to the block table having the next storing priority, as in step S510.

Here it is assumed that the storing priority of the block table 314 is next to that of the block table 312, and all the memory blocks placed in the block table 314 have only 1 error correction bit. When the block table 312 does not have extra storage space for storing data, the access control unit 304 points the data transmission path to the block table 314 and then repeats steps S504 etc until a block table having extra storage space for storing data is found.

Here it is assumed that the block table 320 is the block table having the lowest storing priority in the memory unit 306. If the access control unit 304 sequentially points the data transmission path from the block table 312 to the block table 320 and none of these block tables has extra storage space, and while executing step S508, the access control unit 304 determines that the block table 320 is the block table having the lowest storing priority which also has no extra storage space for storing data, the access control unit 304 can directly execute step S512, namely, give up storing the data since the block table 322 is a disabled block table and accordingly the memory blocks placed therein are not used for storing data.

Figure 6:
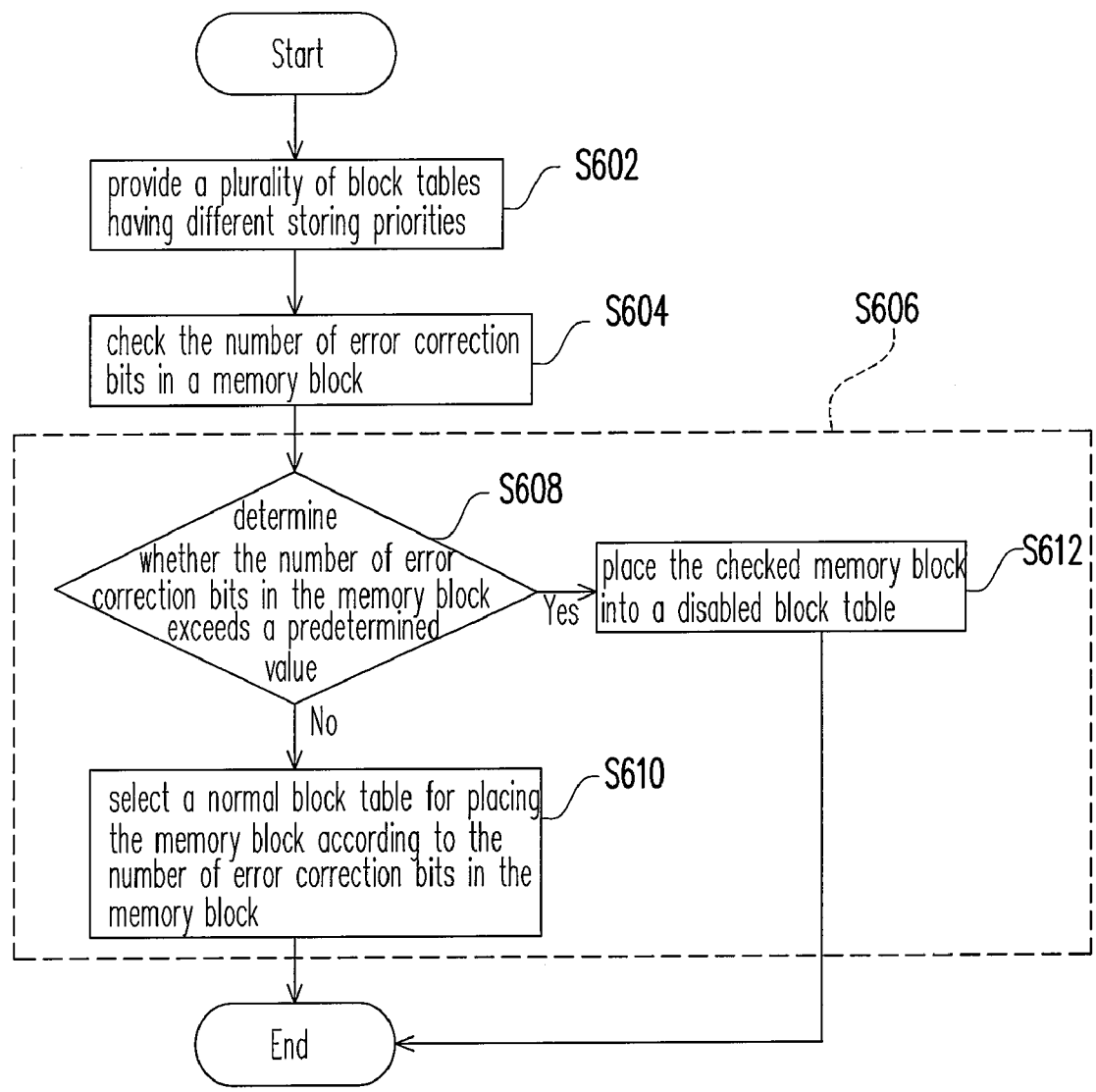
FIG. 6 is a flowchart illustrating a method for managing a memory block according to an embodiment of the present invention.

FIG. 6 is a flowchart illustrating a method for managing a memory block according to an embodiment of the present invention, wherein the method is suitable for a storage apparatus. Referring to FIG. 6, in the present embodiment, a plurality of block tables having different storing priorities is provided, as in step S602. In the present embodiment, these block tables include one or multiple normal block tables and a disabled block table, wherein the functions of these tables have been described above therefore will not be described herein. Next, in step S604, the number of error correction bits in the memory block in one or plural normal block tables are checked. Thus, according to the present invention, a block table can be selected for placing a memory block according to the number of error correction bits in the memory block being checked, as in step S606.

Step S606 will be described in detail herein. In the present embodiment, after the step S604 is executed, whether the number of error correction bits in the memory block exceeds a predetermined value is determined, as in step S608. If the number of error correction bits in the memory block does not exceed the predetermined value (as "no" in step S608), which means the memory block being checked is normal or usable, a normal block table is selected for placing the memory block according to the number of error correction bits in the memory block, as in step S610.

On the other hand, if it is determined that the number of error correction bits in the memory block being checked exceeds the predetermined value (as "yes" in step S608), which means the memory block cannot be used for storing data anymore thus the memory block is placed in the disabled block table, as in step S612, the memory block will be placed in the disabled block table to avoid storing data in this memory block. In some other embodiments of the present invention, when the disabled block table has no more space, meaning that the storage apparatus is not usable anymore as the number of error correction bits being in a memory block which is exceeding the predetermined value and needs to be placed into the disabled block table, and the storage apparatus is locked so that the storage apparatus is not used for storing data anymore.

In summary, according to the present invention, a suitable block table is selected for placing a memory block according to the number of error correction bits in the memory block. Thereby, in the present invention, access to memory blocks at the edge of being disabled is reduced and the lifespan of the storage apparatus is extended. Moreover, since those memory blocks having the same number of error correction bits are placed in the same block table, the user can monitor the healthiness of the storage apparatus efficiently.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data accessing method, suitable for a storage apparatus having a plurality of memory blocks, the plurality of memory blocks being respectively placed in at least one of a plurality of block tables, the data accessing method comprising:

accessing data from at least one of the plurality of memory blocks;

checking whether the memory block has error bits;

when the memory block has the error bits, correcting the error bits and detecting corrected error bits as error correction bits; and determining one of the plurality of block tables in which the memory block is placed according to a number of the error correction bits in the memory block, so that the plurality of memory blocks which has the same number of the error correction bits is placed in the same block table, wherein the plurality of block tables have different storing priorities according to the number of the error correction bits.

2. The data accessing method according to claim 1, wherein the plurality of block tables comprise a plurality of normal block tables and a disabled block table.

3. The data accessing method according to claim 2, wherein the step of determining one of the plurality of block tables in which the memory block is placed comprises:

determining whether the number of error correction bits in the memory block is greater than a predetermined value;

when the number of error correction bits in the memory block is not greater than the predetermined value, moving the memory block from a current block table to one of the normal block tables or keeping the memory block in the current block table; and when the number of error correction bits in the memory block is greater than the predetermined value, moving the memory block to the disabled block table so that when next time a data is to be stored, the data is not stored in the memory block in the disabled block table.

4. The data accessing method according to claim 1, wherein the memory block is kept in the current block table when the memory block has no error bit.

5. The data accessing method according to claim 1, wherein the storage apparatus is a non-volatile memory storage apparatus.

6. A method for managing a memory block, suitable for a storage apparatus, the method comprising:

providing a plurality of block tables having different storing priorities;

checking a number of error correction bits in the memory block; and placing the memory block into one of the plurality of block tables according to the number of error correction bits in the memory block, so that the sequence in which the memory block is used for storing data can beis determined while storing data.

7. The memory block management method according to claim 6, wherein the plurality of block tables comprise a plurality of normal block tables and a disabled block table.

8. The memory block management method according to claim 7 further comprising:

determining whether the number of error correction bits in the memory block is greater than a predetermined value;

when the number of error correction bits in the memory block is not greater than the predetermined value, placing the memory block into one of the normal block tables; and when the number of error correction bits in the memory block is greater than the predetermined value, placing the memory block into the disabled block table so that the memory block is not used for storing data.

* * * * *